3,589,982
PRODUCTION OF L-ASPARAGINASE
Robert E. Peterson and Alex Ciegler, Peoria, Ill., assignors to the United States of America as represented by the Secretary of Agriculture
No Drawing. Filed May 1, 1969, Ser. No. 821,107
Int. Cl. C07g 7/028
U.S. Cl. 195—66                                6 Claims

ABSTRACT OF THE DISCLOSURE

L-asparaginase is produced in high yield by culturing certain fungi, namely, *Erwinia aroideae* or *Hydrogenomonas eutropha*.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to the production of L-asparaginase, and has for its prime object the provision of processes for preparing the said enzyme in yields higher than heretofore attainable. Further objects of the invention will be evident from the following description wherein parts and percentages are by weight unless otherwise specified.

L-asparaginase is an enzmye which has the ability of converting asparagine into aspartic acid. Because of this ability, the enzyme may be used in synthesizing aspartic acid. It may also be employed in analytical procedures—for example, to remove asparagine from mixtures of amino acids produced by hydrolyzing proteins. In recent years L-asparaginase has received interest for its antitumor activity; for example, it has been found to be capable of remitting lymphomas in mice. See Prager et al., Jour. of Immunology, vol. 98, No. 5, pp. 1045–1052 (1967); Cedar et al., Jour. Biological Chem., vol. 242, No. 16, pp. 3753–3755 (1967); Rowley et al., Biochemical and Biophysical Research Communications, vol. 28, No. 2, pp. 160–165 (1967).

It is known that L-asparaginase is elaborated by certain microorganisms such as *Escherichia coli* and *Serratia marcescens*. Conventional production techniques involve extracting the enzyme from cultures of the aforesaid bacteria. A major problem in the known procedures is that the yields of L-asparaginase are low.

A primary object of the invention is to provide the means for remedying the aforesaid problem. We have found that certain bacteria provide yields of L-asparaginase much higher than previously attainable.

The bacteria used in accordance with the invention, and which provide the desired high yields of the desired enzyme, are *Erwinia aroideae* and *Hydrogenomonas eutropha*. Various strains of these organisms may be employed. The preferred strains, in the case of the first-named bacterium, are B–134, B–136, and B–138; in the case of the second-named bacterium, B–2804. Cultures of these organisms have been deposited in the Stock Culture Collection of the U.S. Department of Agriculture, Northern Regional Research Laboratory, Peoria, Ill., from which organization samples of these strains may be obtained.

In addition to providing high yields of the enzyme in question, our process yields a single L-asparaginase (in contrast to some microorganisms which produce multiple L-asparaginases of different properties), and does not produce any enterotoxins.

In a practice of the invention the bacteria are cultured under aerobic conditions in a conventional nutrient medium. As well understood in the art, the medium will contain an assimilable carbon source and an assimilable nitrogen source.

The assimilable carbon source may be, for example, a carbohydrate such as glucose, sucrose, maltose, beet or cane molasses, and the like. Of these, glucose is preferred and is generally used in a concentration of about 1%.

The assimilable source may be, for example, meat extracts or hydrolysates, yeast extracts or hydrolysates, soybean meal, distiller's dried solubles, corn steep liquor, and the like.

The nutrient medium may also contain the usual nutrient salts such as potassium acid phosphate. No special pains need be taken with regard to trace minerals—these are provided by the inorganic substances present as normal impurities in the various components of the medium, for example, in the carbon and nitrogen sources and in the diluent (ordinary tap water).

During the fermentation it is not necessary to control the pH. Generally, the pH of the medium is adjusted to about 7.0 prior to inoculation but no attempt need be made to keep it at this level during the course of the fermentation.

The temperature of the fermentation may be that conventional in culturing bacteria, and is preferably from about room temperature (25° C.) to about 35° C.

The fermentation may be carried out by a shake-flask technique for small runs. For larger scale operation, it is preferred to carry out the fermentation in a tank applying agitation and aeration to the inoculated liquid medium, that is, to conduct the culture under submerged aerated conditions.

The L-asparaginase elaborated by the bacteria is largely associated with the cell material, as opposed to the broth. For this reason, a preliminary step in recovery of the product will involve a treatment of the fermentation product by such means as centrifugation to separate out the cellular material. Various known procedures may be used to extract the enzyme and purify it. These procedures will generally involve the following steps: The cell material is broken down to release the enzyme. This can be accomplished by such techniques as grinding the cells in the presence of abrasive grains, application of ultra-sonic energy (sonication), osmotic shock, or treatment with cell-lysing enzymes (preferably lysozyme). Having released the enzyme from the cells, the impure aqueous solution thereof is treated to remove nucleic acids (by precipitation with a manganese salt) and to remove polysaccharides (by precipitation with a barium salt). Next, to the partially-purified solution is added solid ammonium sulphate (to about 15% saturation) to precipitate undesired components, and more solid ammonium sulphate (to about 40% saturation) is then added to precipitate a fraction high in L-asparaginase activity. This fraction is then further purified, as by dialysis, to provide the pure enzyme.

EXAMPLES

The invention is further demonstrated by the following illustrative examples.

In Example 1, various organisms outside the scope of the invention were included for purposes of comparison.

Explanation of abbreviations used in the examples:

"Tris" refers to the compound tris-(hydroxymethyl) aminomethane.

"EDTA" refers to the compound ethylene diamine tetraacetic acid.

Example I

A medium having the following composition was prepared:

| | Gm. |
|---|---|
| Tryptone | 5 |
| Yeast extract | 5 |
| Glucose | 1 |
| Potassium phosphate ($K_2HPO_4$) | 1 |
| Tap water, sufficient to make 1000 ml. | |

Fifty-ml. aliquots of the medium were placed in a series of 300-ml. conical flasks which were then plugged, sterilized, and cooled.

Each flask was inoculated with a single loop transfer of cells from an agar slant of the organism to be tested. The flasks were then agitated on a Gump rotary shaker at 200 r.p.m. at 28° C. for 24 hours. The cultures were then assayed for L-asparaginase, using the procedure described below.

Assay: A 0.1-ml. aliquot of the culture, 0.9 ml. of 0.1 M sodium borate buffer (pH 8.5), and 1 ml. of 0.04 M L-asparagine solution are combined and incubated for 10 minutes at 37° C. The reaction is stopped by the addition of 0.5 ml. of 15% (w./v.) trichloroacetic acid. After centrifugation, a 0.1-ml. portion of the supernatant is diluted to 8 ml. with distilled water and treated with 1 ml. of Nessler's reagent and 1 ml. of 2 M NaOH. The color reaction is allowed to proceed for a 15-minute development period and the optical density at 500 m$\mu$ is then determined. The optical density is compared to a standard curve prepared from solutions of ammonium sulphate as the ammonia source. One international unit (IU) of L-asparaginase is that amount of enzyme which liberates 1 $\mu$mole of ammonia in 1 minute at 37° C.

The organisms used and the yields of L-asparaginase are shown in the following table.

TABLE I

| Organism tested: | L-asparaginase produced (IU/gm. dry wt. of cells) |
|---|---|
| Erwinia aroideae, NRRL B-134 | 735 |
| Erwinia aroideae, NRRL B-136 | 550 |
| Erwinia aroideae, NRRL B-138 | 770 |
| Hydrogenomonas eutropha, NRRL B-2804 | 620 |
| Escherichia coli, NRRL B-1109 | 65 |
| Escherichia coli, NRRL B-718 | 225 |
| Proteus vulgaris, NRRL B-398 | 370 |
| Proteus vulgaris, NRRL B-3405 | 250 |
| Serratia marcescens, NRRL B-337 | 215 |
| Serratia marcescens, NRRL B-1481 | 335 |
| Erwinia amylovora, NRRL B-406 | 85 |
| Erwinia amylovora, NRRL B-129 | 0 |
| Erwina carotovora, NRRL B-35 | 330 |
| Erwinia carotovora, NRRL B-143 | 450 |

Example II

The experiment of Example I was repeated with *Erwinia aroideae*, NRRL B-136; however, at the end of the 24-hour incubation period the contents of the flask were transferred aseptically to a 2.8-liter conical flask containing 500 ml. of the described medium and incubated under the same conditions for an additional 24 hours. The yield of L-asparaginase was 890 IU/gm. dry wt. of cells.

Example III

*Erwinia aroideae*, NRRL B-138 was first cultured as described in Example I except that the time was reduced to 8 hours. The contents of the flask were then transferred aseptically to a 2.8-liter conical flask containing 500 ml. of the described medium and incubated under the same conditions for an additional 8 hours. Then, the contents of the flask were transferred aseptically to a 20-liter stainless steel fermentor containing 10 liters of the described medium. Incubation conditions were as follows:

Aeration—0.5 vol./min.
Temperature—28° C.
Stirring—250 r.p.m.

After an 8-hour growth period the fermentation product was assayed. The yield of L-asparaginase was 3200 IU/gm. dry wt. of cells.

Example IV

*Erwinia aroideae*, NRRL B-138 was cultured first by a shake-flask technique, then in a deep tank fermentation, essentially as described in Example III.

The fermentation product was centrifuged to separate the cells. These cells were washed with phosphate buffer ($Na_2HPO_4$, 4.757 gm.; $KH_2PO_4$, 4.539 gm.; commercial non-ionic surfactant (Triton X–100), .0125 ml.; distilled water to 1 liter; pH adjusted to 7.0).

The washed cells (40 gm.) were suspended in 1 liter of 20% sucrose—0.033 M tris buffer, pH 8.0. Successive treatments of the cells with 0.01 volume of 0.1 M EDTA, pH 8.0, and 10 $\mu$l. lysozyme (5 mg./ml.) per ml. of suspension were performed at 5° C. The suspension was stirred gently and osmotic fragility checked at 15-minute intervals by determining the optical density at 490 m$\mu$.

After the decrease in optical density had ceased, the suspension was centrifuged at 13,000$\times g$ for 2 hours. The supernatant was then treated with 0.05 volume of 1 M $MnCl_2$ to partially remove nucleic acids. After addition of the $MnCl_2$, the suspension was stirred for 1 hour, allowed to stand for 15 minutes, and centrifuged to remove the precipitate. The clear supernatant was treated with 0.06 volume of 1 M $BaCl_2$ and stirred for 20 minutes. The precipitated polysaccharides were removed by centrifugation.

To the clear supernatant, solid ammonium sulphate was added to 15% saturation over a period of 15 minutes with constant stirring. After a 30-minute equilibration period, the precipitated impurities were removed by centrifugation. A second ammonium sulphate addition, to 40% saturation, yielded a precipitated fraction high in L-asparaginase activity.

The precipitated fraction was dissolved in 100 ml. of 0.5 M NaCl—0.01 M tris-HCl (pH 7.4)—and dialyzed against the same buffer for 16 hours with 3 changes of the surrounding buffer solution. Approximately 125 ml. of enzyme solution were recovered. This solution contained the desired end product, L-asparaginase, in a pure form.

To test the purity of the product, a portion thereof was placed on a column packed with DEAE Sephadex (A–25)—a cellulose anion exchanger containing diethylaminoethyl residues as functional groups. The column was then eluted with 0.1 M NaCl (pH 7.4) while collecting the effluent in separate small fraction (3.5 ml.). Assay of the effluent fractions showed that only one band of L-asparaginase was present. The significance of this is explained as follows: Data in the literature shows that more than one L-asparaginase may be present in a microorganism (J. H. Schwartz, J. Y. Reeves, and J. D. Broome, Proc. Natl. Acad. Sci. 56, 1516–1519, 1966). However, only one of these enzymes possesses antileukemic activity. Therefore, the second enzyme merely acts as another contaminating substance with no activity that must be removed from the enzyme preparation. Its presence may give a false impression as to the true amount of "active" enzyme present in the enzyme preparation. Since our product contains a single L-asparaginase, it is all active, and is not subject to the disadvantages outlined above.

Example V

An L-asparaginase preparation produced essentially as set forth in Example IV and having an activity of 40 IU/ml., was tested for its effect on mice which had been implanted with tumors (Gardner lymphosarcoma, 6 C 3 HED).

The L-asparaginase preparation was diluted and applied by injection. It was found that with a level of 3.7 IU, tumor regression averaged 6.0 mm. At higher levels (5 IU) of L-asparaginase injection, complete regression of tumors was observed in 4 days. The results indicate that the L-asparaginase produced in accordance with the invention is not only effective against the lymphoma identified above, but also that it is free of enterotoxin activity.

Having thus described the invention, what is claimed is:

1. A process for preparing L-asparaginase which comprises culturing *Erwinia aroideae* on a nutrient medium under aerobic conditions, and recovering L-asparaginase from the culture.

2. The process of claim 1 wherein the *Erwinia aroideae* is NRRL B-134.

3. The process of claim 1 wherein the *Erwinia aroideae* is NRRL B-136.

4. The process of claim 1 wherein the *Erwinia aroideae* is NRRL B-138.

5. A process for preparing L-asparaginase which comprises culturing *Hydrogenomonas eutropha* on a nutrient medium under aerobic conditions, and recovering L-asparaginase from the culture.

6. The process of claim 5 wherein the *Hydrogenomonas eutropha* is NRRL B-2804.

References Cited

Wade et al., The Lancet, Oct. 5, 1968, pp. 776-777.

LIONEL M. SHAPIRO, Primary Examiner